United States Patent [19]

Thomas

[11] Patent Number: 5,165,948
[45] Date of Patent: Nov. 24, 1992

[54] PROCESS FOR DEHYDRATING A PRODUCT BASED ON FATS

[75] Inventor: Remi Thomas, Berneuil En Bray, France

[73] Assignee: Nestec S.A., Vevey, Switzerland

[21] Appl. No.: 667,035

[22] Filed: Mar. 11, 1991

[30] Foreign Application Priority Data

Mar. 24, 1990 [FR] France .............................. 90 105636

[51] Int. Cl.$^5$ ................................................ F26B 3/00
[52] U.S. Cl. .................................... 426/242; 426/465
[58] Field of Search ............... 426/242, 241, 465, 472; 34/1, 15; 219/10.55 M

[56] References Cited

U.S. PATENT DOCUMENTS 3,431,119  3/1969  Griffon ................................ 426/464
4,640,020  2/1987  Wear et al. ................... 219/10.55 M

FOREIGN PATENT DOCUMENTS 60-126039  7/1985  Japan ................................... 426/242
2-39849    2/1990  Japan ................................... 426/242
073574    10/1981  United Kingdom .
209265     5/1989  United Kingdom .

OTHER PUBLICATIONS

Abstract of Sugisawa "Method for drying food containing fat or oil with microwave", Japanese Patent Kokai No. 60-186267(A) (1985).

Primary Examiner—George Yeung
Attorney, Agent, or Firm—Vogt & O'Donnell

[57] ABSTRACT

A fat-absorbing substance is added to a fat-based food, such as cream and cheese, which then is dehydrated with microwave radiation under reduced pressure.

11 Claims, 1 Drawing Sheet

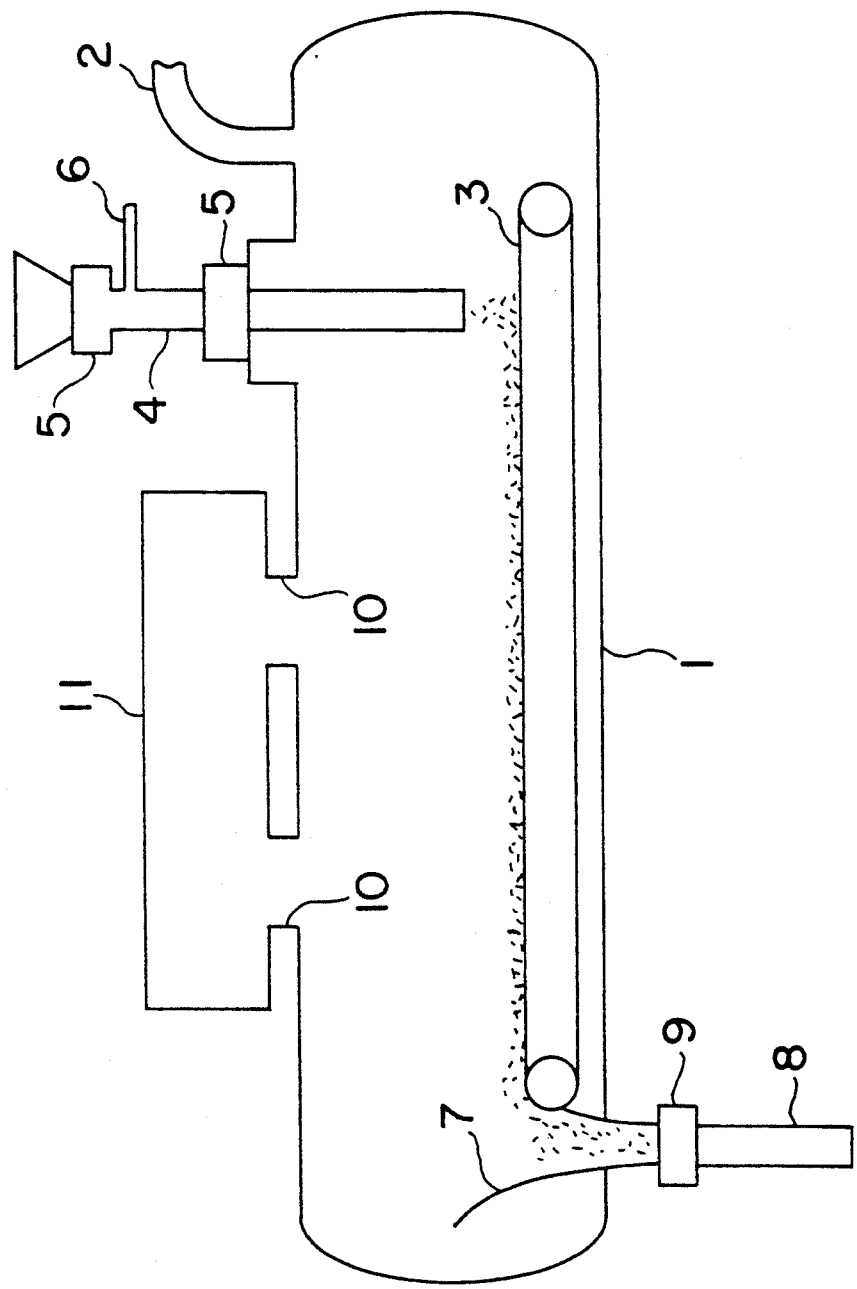

PROCESS FOR DEHYDRATING A PRODUCT BASED ON FATS

BACKGROUND OF THE INVENTION

This invention relates to a process for the dehydration of a product based on fats which is to be rehydrated.

More particularly, the present invention relates to a process for the dehydration of a food product based on fats which is to be rehydrated, wherein the product is exposed to microwaves under reduced pressure.

Processes for dehydrating food products by microwaves under reduced pressure are known to be the cause of electrical arcing inside the microwave apparatus which, on the one hand, adversely affects the installation and, on the other hand, denatures the product to be treated.

According to UK Patent Application GB No. 2 209 265 A, for example, these problems can be solved by a process in which the food product to be dehydrated is placed in an oil bath inside an enclosure where a reduced pressure of 2660 Pa prevails, the product being subjected to treatment with microwaves.

In this patent, which describes numerous examples in which the food product to be treated consists of apples, it is also pointed out that many other food products, for example cheeses, can be dehydrated.

Now, it has been found that, if it is desired to obtain a dehydrated fat by this process, there is a double diffusion, of oil into the fats to be treated, on the one hand, and of certain fractions of the fats into the oil, on the other hand.

Thus, although a dehydrated fat is effectively obtained by this process, the end product obtained is excessively denatured in relation to the original product and cannot be subsequently used in culinary products.

Accordingly, were carried out tests to determine whether products based on fats could be dehydrated in microwave installations without using an oil bath.

These tests revealed numerous problems.

More particularly, when the fat is treated in the form of pieces a few millimeters thick, as for example in the case of grated cheese, it flows with difficulty which complicates the dosing operations to an extent which is greater, the smaller the size of the pieces. It was thus found that this phenomenon becomes particularly crucial for pieces of which the largest size is under two millimeters, in which case the fats tend to solidify, thus preventing satisfactory flow.

In addition, during dehydration by microwaves, the fats tend to melt which results in heavy exudation from the product to be treated, most of the molten fats then being reabsorbed by the product during cooling.

Thus, during extraction of the final dehydrated product, the constituent pieces are agglomerated so that the product has to be ground in an additional step.

Now, to prevent the fats from remelting during grinding, grinding has to be carried out at a very low temperature under liquid nitrogen. Grinding is thus very difficult to carry out.

SUMMARY OF THE INVENTION

The object of the present invention is to provide a process for the dehydration of a fat-based product by microwaves which would solve these problems.

The present invention provides a process for dehydration of a fat-based food, including cheese and cream, wherein a fat-absorbing substance is added to the fat-based food to obtain a fat-based food product, and then microwave radiation is applied to the food product in a microwave enclosure under reduced pressure to dehydrate the food product, wherein the fat-absorbing substance absorbs fats exuded by the fat-based food during application of microwave radiation.

In addition to cream, the cheese treated in accordance with the present invention may be fresh or cooked cheese, and may include Guyère and Emmental. Depending upon the purpose for which the fat-based food product is ultimately intended, the fat-absorbing substance, which is capable of absorbing fats exuded at the surface of the fat-based food, may be selected from amylaceous substances, gums and caseinates. The reduced pressure may range from 1066 Pa to 2666 Pa.

When the fat-based food to be dehydrated is a solid product, the process of the present invention advantageously is preceded by a pretreatment to reduce the particle size of the food since, as disclosed below, it has been found that particle size influences drying temperature, and the drying temperature preferably is below 60° C.

It has been found that by proceeding with the process of the present invention, the fat-absorbing substance enables increased fluidity of the fat-based food before microwave treatment, for example such as when the food is grated cheese, and enables avoiding solidification of the fat-based food product after microwave treatment, irrespective of the nature of the fat-based food, by reason of absorbing fats exuded from the food during the microwave treatment.

BRIEF DESCRIPTION OF THE DRAWING FIGURE

Further characteristics and advantages of the invention will become apparent from the following description of the accompanying drawing which illustrates, purely by way of example a microwave dehydrating installation for carrying out the process according to the invention.

DETAILED DESCRIPTION OF THE DRAWING FIGURE

As shown in the drawing, an installation for carrying out the process according to the invention comprises a microwave oven consisting of a cylindrical enclosure 1 connected to a vacuum source 2 through which circulates a belt 3 carrying the product to be dehydrated.

The product may be introduced into the enclosure 1 of the oven through an air-lock 4 in the form of a cylinder closed at either end, for example by a slide valve 5.

A system 6 for establishing a vacuum in the air-lock 4 enables successive batches of product to be introduced into the enclosure 1 of the furnace at one of the ends of the belt 3.

At the other end of the belt 3, the dehydrated product falls through a funnel 7 into a reservoir 8 to which it is connected by a valve 9.

The enclosure 1 receives the microwave radiation through one or more windows 10 connected to a microwave generator 11.

FURTHER DETAILED DESCRIPTION OF THE INVENTION

When the product to be dehydrated is a solid product, such as a grated cheese of the Emmental type, it has been found that the size of the constituent particles of the product to be treated has a considerable influence on the drying temperature in the microwave installation and, hence, on the exudation of fats during microwave drying.

More particularly, tests were carried out with a grated cheese of the Emmental type.

In these tests, the throughput of product was fixed at 12 kg/h, the output of the microwave oven was 4.1 kW, the drying time was 60 minutes and the pressure in the enclosure of the oven was 1066 Pa.

The outcome of these tests is summarized in Table 1 below, the temperature being measured by an infrared pyrometer, DM standing for dry matter.

TABLE 1

Effect of particle size on drying

| Particle Size | Initial DM content % | Microwave output kW | Infrared temperature °C. | Final DM content % |
|---|---|---|---|---|
| Pieces 1 mm | 67.11 | 4.1 | 64 | 96.66 |
| Pieces 2 mm | 67.11 | 4.1 | 71 | 95.96 |
| Pieces 5 mm | 67.11 | 4.1 | 81 | 96.36 |

The temperatures indicated by the infrared pyrometer were verified by introducing heat-sensitive paper into the layer of product. The values obtained are slightly higher although the temperature differences between the various tests remain.

It is thus clear that the drying temperature depends largely on the particle size. In the case of large particles, where water loss is more difficult, there is an accumulation of energy.

Accordingly, a small particle size, by reducing the drying temperature, reduces the exudation phenomena during drying; on the other hand, it tends to make the flow of the product before drying more difficult. In addition, the reduction in the drying temperature is not sufficient to eliminate the exudation phenomena completely.

The use of a fat-absorbing substance, by ensuring better flow of the product, overcomes this disadvantage and, in addition, a small particle size, by reducing the exudation phenomena through lowering of the drying temperature, reduces the quantity of fat-absorbing substance necessary.

The combination of a fat-absorbing substance and a product of small particle size thus enables a remarkable result to be obtained.

A pretreatment comprising reducing the particle size of the product to be treated can thus be carried out with advantage.

Another important parameter which determines the quality of the dehydration obtained is the pressure prevailing in the enclosure of the microwave oven. To this end, tests were carried out in which the throughput of product to be treated was fixed at 12 kg/h, the particle size was 1 mm, the output of the microwave oven was 4.2 kW, the residence time was 60 mins, and the initial dry matter content was 66.22%, the product being an Emmental.

The temperature, the water activity during dehydration and at the end of the process, and the final dry matter contents were measured during these tests.

The results are set out in Table 2 below:

TABLE 2

Effect of pressure on drying

| Pressure in enclosure | | Temperature of product in °C. | Water activity at surface of product during dehydration | Water activity measured at 25° C. after dehydration | Final DM content % | Water evaporated per KW kg |
|---|---|---|---|---|---|---|
| mm Hg | Pascals | | | | | |
| 8 | 1066 | 60 | 0.055 | 0.30 | 96.8 | 0.903 |
| 14 | 1866 | 61 | 0.089 | 0.39 | 95.91 | 0.889 |
| 20 | 2666 | 66 | 0.102 | 0.46 | 95.46 | 0.875 |

It is thus clearly apparent that the effect of pressure on the drying temperature and hence on exudation is considerable, particularly when passing from 2666 Pa to 1866 Pa. In addition, by promoting the desorption of water from the product, the reduction in pressure improves the final dry matter content by increasing the quantity of water evaporated per kW.

There is a considerable difference between the calculated water activity of the product during drying and the value measured after drying which is due to the poor transfer of water in the product. The migration of water inside the particles is poor which again explains the important role of particle size during drying of the Emmental.

The minimum pressure was fixed at 8 mm Hg, 1066 Pa, to avoid electrical arcing.

EXAMPLES

The following Examples illustrate the application of the process according to the invention to various products based on fats.

EXAMPLE 1

A cream containing 35% fat is introduced into the enclosure of a microwave oven where a reduced pressure of 1066 Pa prevails.

To prevent the fats from exuding, a fat-absorbing substance was added in a quantity of 5% by weight.

Various tests were carried out using a xanthan gum, a corn starch or a sodium caseinate.

The drying temperature is fixed at 42° C.

The end product obtained contains 70% fat, based on dry matter.

EXAMPLE 2

Emmental is ground to a particle size of 0.5 mm in an 80 liter capacity bowl cutter by introducing the Emmental in the form of pieces weighing 0.2 to 0.5 kg.

The rotational speed of the cutters is kept at 250 r.p.m. for one minute to avoid splashing and is then increased to 3000 r.p.m. for four minutes.

Potato starch is added after two minutes in a quantity of 10% by weight, based on the weight of the Emmental.

The dehydration conditions are as follows:
feed rate into oven enclosure: 90 kg/h
residence time in oven: 80 mins.
pressure in enclosure: 10 mm Hg
power output of oven: 27 kW
dry matter content of product: 67% infrared temperature: 50° C.±3° C.

The dry matter content after dehydration was 96%.

EXAMPLE 3

An Emmental prepared in the same way as in Example 2 was introduced into the enclosure of a microwave oven of which the operating parameters were as follows:

rate of entry: 114 kg/h
residence time in oven: 110 mins.
pressure in enclosure: 10 mm Hg
power output of oven: 27 kW
dry matter content of product: 69%
infrared temperature: 44° C.±2° C.

The dry matter content after dehydration was 98%.

In the three above Examples, it was thus possible to obtain satisfactory dehydration in that the end product was not denatured in relation to the starting product while, at the same time, solidification of the product during cooling after dehydration was avoided.

Limiting the infrared temperature to a maximum of 50° C. enables the exudation phenomena to be limited and the quantity of fat-absorbing substance necessary to be reduced.

In addition, the storage tests carried out revealed a storage life at least equal to that obtained by the conventional processes of freeze-drying or spray-drying.

I claim:

1. A process for dehydration of a fat-based food comprising adding a fat-absorbing substance to a fat-based food selected from the group of fat-based foods consisting of cream and cheese to obtain a fat-based food product and then applying microwave radiation to the food product in a microwave enclosure under reduced pressure to dehydrate the food product, wherein the fat-absorbing substance absorbs fats exuded by the fat-based food during application of microwave radiation.

2. A process according to claim 1 wherein the fat-based food is a solid cheese which has a particle size of at most 1 mm.

3. A process according to claim 1 or 2 wherein the reduced pressure is a pressure of from 1066 Pa to 2666 Pa.

4. A process according to claim 3 wherein in the food product has a temperature of below 60° C. during application of microwave radiation.

5. A process according to claim 1 or 2 wherein the fat-absorbing substance is selected from the group of substances consisting of an amylaceous substance, a gum and a caseinate.

6. A process according to claim 3 wherein the fat-absorbing substance is selected from the group of substances consisting of an amylaceous substance, a gum and a caseinate.

7. A process according to claim 1 or 2 wherein the fat-absorbing substance is selected from the group of substances consisting of corn starch and potato starch.

8. A process according to claim 3 wherein the fat-absorbing substance is selected from the group of substances consisting of corn starch and potato starch.

9. A process according to claim 1 wherein the fat-based food is cream and the fat-absorbing substance is selected from the group of substances consisting of xanthum gum and sodium caseinate.

10. A process according to claim 1 or 2 wherein the fat-based food is a cheese which is selected from the group of cheeses consisting of Guyère and Emmental.

11. A process according to claim 3 wherein the fat-based food is a cheese which is selected from the group of cheeses consisting of Guyère and Emmental.

* * * * *

UNITED STATES PATENT AND TRADEMARK OFFICE
CERTIFICATE OF CORRECTION

PATENT NO. : 5,165,948
DATED : November 24, 1992
INVENTOR(S) : Remi THOMAS

It is certified that error appears in the above-identified patent and that said Letters Patent is hereby corrected as shown below:

Column 1, line 38, after the comma after "Accordingly" and before "were", insert --tests--, and after "out", delete "tests".

Column 2, line 40, insert a comma after "example".

Column 6, line 9 (line 1 of claim 4), delete "in".

Signed and Sealed this

Twenty-third Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,165,948
DATED : November 24, 1992
INVENTOR(S) : Remi THOMAS

It is certified that error appears in the above-indentified patent and that said Letters Patent is hereby corrected as shown below:

Column 1, line 38, after the comma after "Accordingly" and before "were", insert --tests--, and after "out", delete "tests".

Column 2, line 40, insert a comma after "example".

Column 6, line 9 (line 1 of claim 4), delete "in".

Signed and Sealed this

Fourth Day of January, 1994

Attest:

BRUCE LEHMAN

*Attesting Officer*    Commissioner of Patents and Trademarks